United States Patent [19]

Töpfl et al.

[11] 3,951,891
[45] Apr. 20, 1976

[54] PREPARATIONS OF REACTION PRODUCTS OF EPOXIDES, FATTY AMINES AND FATTY ACIDS, PROCESS FOR THEIR MANUFACTURE AND THEIR USE

[75] Inventors: Rosemarie Töpfl, Dornach; Max Schwank, Basel; Arthur Maeder, Therwil, all of Switzerland

[73] Assignee: Ciba-Geigy Corporation, Ardsley, N.Y.

[22] Filed: Sept. 25, 1974

[21] Appl. No.: 508,957

[30] Foreign Application Priority Data
Oct. 5, 1973  Switzerland........................ 14256/73
Dec. 12, 1973  Switzerland........................ 17405/73

[52] U.S. Cl. .............................. 260/21; 260/18 EP; 260/29.4 R; 260/33.8 R; 260/999; 427/386
[51] Int. Cl.$^2$ .................... C08G 8/32; C08G 59/00; C08L 61/26; C08L 63/02
[58] Field of Search ........................... 260/21, 18 EP

[56] References Cited
UNITED STATES PATENTS

| | | | |
|---|---|---|---|
| 2,448,338 | 8/1948 | Widmer et al. ........................ | 260/21 |
| 2,491,249 | 12/1949 | Cathers et al. ........................ | 260/21 |
| 3,051,674 | 8/1962 | Kress ...................................... | 260/21 |
| 3,300,424 | 1/1967 | Hoenel et al. ......................... | 260/21 |
| 3,563,926 | 2/1971 | Lackner ................................. | 260/21 |
| 3,607,803 | 9/1971 | Töpfl et al. ............................ | 260/21 |
| 3,649,575 | 3/1972 | Töpfl et al. ............................ | 260/21 |
| 3,709,847 | 1/1973 | Töepfl et al. ..................... | 260/18 PN |
| 3,716,402 | 2/1973 | Hicks ............................. | 260/47 EC |
| 3,769,365 | 10/1973 | Töepfl et al. ........................ | 260/834 |
| 3,843,391 | 10/1974 | Töepfl et al. ..................... | 260/404.5 |
| 3,843,396 | 10/1974 | Mueller et al. ...................... | 117/141 |
| 3,860,540 | 1/1975 | Abel et al. ....................... | 260/18 EP |

*Primary Examiner*—Ronald W. Griffin
*Attorney, Agent, or Firm*—Joseph G. Kolodny; Edward McC. Roberts; Prabodh I. Almaula

[57] ABSTRACT

New reaction products (1) of (a) epoxides, (b) fatty amines (c) dimerized and/or trimerized fatty acids and optionally of (d) anhydrides of aromatic or aliphatic dicarboxylic acids or of monocarboxylic acids, (e) aliphatic saturated dicarboxylic acids and/or (f) difunctional compounds and (2) aminoplast precondensates that contain alkyl ether groups are provided. The aminoplast precondensate is used in admixture with (1) or as a reaction component for the manufacture of (1) or is used as mixture and reaction component. The new products are useful for finishing fibrous materials e.g. as binding agents for nonwovens or dressing agents for leather. The so treated substrates additionally show antimicrobial properties.

46 Claims, No Drawings

PREPARATIONS OF REACTION PRODUCTS OF EPOXIDES, FATTY AMINES AND FATTY ACIDS, PROCESS FOR THEIR MANUFACTURE AND THEIR USE

The present invention provides preparations of reaction products of epoxides, fatty amines and fatty acids in organic solvents which contain 1 reaction products of
  a. an epoxide that contains at least two epoxide groups in each molecule,
  b. a fatty amine with 12 to 24 carbon atoms,
  c. a dimerized and/or trimerized fatty acid that is derived from monomeric unsaturated fatty acids with 16 to 22 carbon atoms, optionally

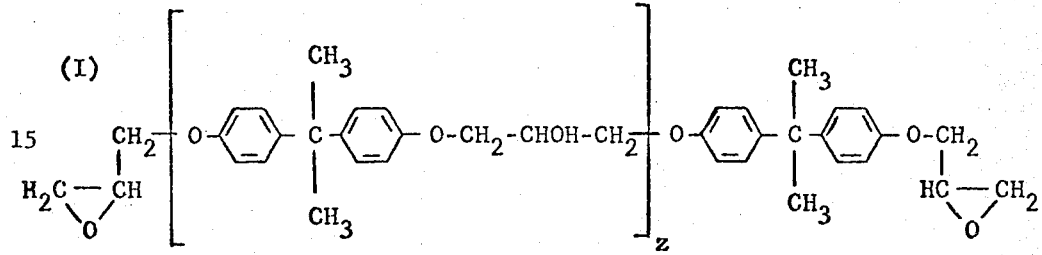

d. an anhydride of an aromatic dicarboxylic acid with at least 8 carbon atoms, an aliphatic monocarboxylic acid with at least 2 carbon atoms or of an aliphatic dicarboxylic acid with at least 4 carbon atoms,
  e. an aliphatic saturated dicarboxylic acid with 2 to 14 carbon atoms and/or
  f. a difunctional compound that differs from components a), d) and e), and
2 an aminoplast precondensate that contains alkyl ether groups and is used in admixture with (1) or as reaction component for the manufacture of (1) or is used as mixture and reaction component.

Other suitable solutions are those that contain
1. reaction products of
  a. an epoxide that contains at least two epoxide groups in each molecule,
  b. a fatty amine with 12 to 24 carbon atoms,
  c. a dimerized and/or trimerized fatty acid that is derived from monomeric unsaturated fatty acids with 16 to 22 carbon atoms,
  e. an aliphatic saturated dicarboxylic acid with at least 4 carbon atoms and/or,
  f. a difunctional compound that differs from components a) and e), and
2. an aminoplast precondensate that contains alkyl ether groups and is used in admixture with (1) or as reaction component for the manufacture of (1) or is used as mixture and reaction component.

Particularly suitable preparations are also those that contain the reaction products which are obtained using components (d) and (e), with aliphatic saturated dicarboxylic acids being used as component e). The component (2) can be used as reaction or mixture component or used concurrently as both.

The invention further provides a process for the manufacture of the preparations and a method of using the reaction products contained in the preparations, for example as dressing agents for leather or as binders for nonwovens. The preparations can be solutions in organic solvents and optionally also aqueous emulsions or dispersions.

The epoxides of the component (a) are derived preferably from polyhydric phenols or polyphenols, e.g. resorcinol, or phenol-formaldehyde condensation products of the type of the resols or novolaks, Bisphenols like bis(4-hydroxyphenyl)methane and, above all, 2,2-bis(4'-hydroxyphenyl)-propane, are especially preferred starting compounds for the manufacture of the epoxides.

Compounds to be mentioned particularly are epoxides of 2,2-bis(4'-hydroxyphenyl)-propane which have an epoxide content of 1 to 6, particularly of 1.8 to 5.8 epoxy group equivalents/kg, but preferably at least 5 epoxy group equivalents/kg, and which have the formula wherein z represents a mean number from 0 to 6, preferably from 0 to 2.2 and optionally also from 0 to 0.65. Such epoxides are obtained by reaction of epichlorohydrin with 2,2-bis-(4'-hydroxyphenyl)-propane.

Mono-fatty amines with 12 to 24 carbon atoms have proved principally to be very suitable components (b). Usually these are amines of the formula $$H_3C-(CH_2)_x-NH_2, \qquad (2)$$

wherein $x$ represents an integer from 11 to 23, preferably from 17 to 21. The amines are therefore, for example, laurylamine, palmitylamine, stearylamine, arachidylamine or behenylamine. Mixtures of these amines, like those obtainable in the form of commercial products, can also be used.

The fatty acids used as component (c) are dimerized and/or trimerized fatty acids that are derived from monomeric unsaturated fatty acids with 16 to 22 carbon atoms. Suitable starting products are in particular those fatty acids that contain at least one, preferably two to five, ethylenically unsaturated bonds, for example hexadecenoic acid, oleic acid, elaidic acid, hiragonic acid, licanic acid, eleostearic acid, arachidonic acid, clupadonic acid and especially linoleic and linolenic acid. These fatty acids, and optionally their mixtures as well, can be obtained from natural oils and fats in which they occur chiefly as glycerides.

As component (d) there is used preferably an anhydride of a monocyclic or bicyclic aromatic dicarboxylic acid with 8 to 12 carbon atoms or of an aliphatic dicarboxylic acid with 4 to 10 carbon atoms or of a monocarboxylic acid with at least 2 to 10 carbon atoms. Anhydrides of a monocyclic aromatic dicarboxylic acid with 8 to 10 carbon atoms have proved particularly advantageous. Particular interest attaches to phthalic anhydride which is optionally substituted by methyl.

Examples of suitable anhydrides for component (d) are accordingly acetic anhydride, maleic anhydride or phthalic anhydride.

If component (e) is used concurrently for the manufacture of the reaction products, the dicarboxylic acids in question are those with at least 2 to 14 carbon atoms, for example those of the formula

HOOC-(CH$_2$)$_{y-1}$—COOH           (3)

wherein y is an integer from 1 to 13, preferably from 5 to 13. Particularly suitable dicarboxylic acids of the formula (3) are those wherein y is an integer from 5 to 9.

Examples of suitable dicarboxylic acids for component (e) are accordingly oxalic, malonic, succinic, glutaric, adipic, pimelic, suberic, azelaic or sebacic acid, nonanedicarboxylic acid, decanedicarboxylic acid, undecanedicarboxylic acid or dodecanedicarboxylic acid. Components (d) and (e) can complement each other if need be.

As functional groups or atoms, the difunctional component (f), which is also optional, preferably contains halogen atoms which are bonded to an alkyl radical, vinyl ester or carboxylic ester groups or at most one epoxide, carboxylic acid or hydroxy group together with another functional group or with another atom of the indicated type. In particular, these compounds are difunctional organic compounds that contain, as functional groups or atoms, alkyl-bonded chlorine or bromine atoms, vinyl ester or carboxylic ester groups or at most one epoxide or carboxylic acid group together with another functional group or another atom of the indicated type.

Particularly suitable difunctional organic compounds are aliphatic. They are, for example, epihalohydrins, such as epibromohydrin or, above all, epichlorohydrin. Other possible difunctional compounds are, for example, glycerol dichlorohydrin, acrylic acid, methylolacrylamide, acrylonitrile.

The aminoplast precondensates used as component (2) are desirably completely or, in particular, partially etherified methylol compounds of nitrogen-containing aminoplast formers, such as urea, thiourea, urea derivatives, e.g. ethylene urea, propylene urea or glyoxalmonourein. The component (2) can also be present simultaneously as mixture component or exclusively as mixture component in the preparations according to the invention.

Preferably, however, etherified methylolaminotriazines are used, for example alkyl ethers of highly methylolated melamine the alkyl radicals of which contain from 1 to 4 carbon atoms. Possible alkyl radicals include methyl, ethyl, n-propyl, isopropyl, n-butyl and n-hexyl radicals. In addition to such alkyl radicals, yet further radicals, for example polyglycol radicals, can also be present in the molecule. Furthermore, n-butyl ethers of a highly methylolated melamine containing 2 to 3 n-butyl groups in the molecule are preferred. By highly methylolated melamines are meant in this context those with an average of at least 5, desirably about 5,5, methylol groups. Preferably, water-insoluble etherified methylolaminotriazines are used.

The manufacture of the reaction products can be carried out by methods which are known per se, wherein the components are reacted with one another in varying sequence. Desirably, the components (a) and (b) or (a), (b) and (c) are first reacted with one another. The reaction of the component (c) with the already reacted components (a) and (b) can also be effected simultaneously, if appropriate, with the components (d), (e) and (f) or with component (2).

On the one hand, it is therefore possible to react the components (a), (b) and (c) initially with one another simultaneously and subsequently, if appropriate, to react the product with the components (d), (e), (f) and (2). In this modification of the process, the components (a), (b) and (c) are reacted with one another desirably at temperatures of 80°C to 120°C, preferably at 100°C, the proportions being generally so chosen that for an epoxide group equivalent of 1 there are used 0.1 to 0.7 amine group equivalent of component (b), 0.2 to 1.5, preferably 0.4 to 1.5, acid equivalents of component (c), 0.1 to 0.8, preferably 0.1 to 0.6 acid equivalent of components (d) and (e), 0.1 to 0.7 mole of component (f) and 10 to 80, preferably 30 to 60, percent by weight of component (2), based on the total weight of the components (a) to (f) and (2). If component (2) is used as mixture component, it can also be used in amounts of about 10 to 80, preferably 30 to 60, percent by weight, based on the total weight of the components (a) to (f) and (2). The use of component (2) as mixture component without its simultaneous use as reaction component for the manufacture of the reaction products is preferred.

On the other hand, it is also possible to react initially the components (a) and (b) alone with each other and then with component (c) and optionally in a third or fourth step with component (d), (e), (f) or (2). The manufacture of the reaction products of (a) and (b) in this second modification is also desirably carried out at temperatures of 80°C to 120°C, preferably at about 100°C. The reaction in the second step with component (c) is carried out desirably at 80°C to 110°C, preferably at about 100°C.

The reaction with components (d), (e), (f) and (2) is carried out normally at temperature of 60°C to 100°C, preferably at about 100°C.

The reaction products that are obtained without using component (2) as reaction component can have as a rule an acid number of 5 to 100, preferably 20 to 60.

Suitable organic solvents in the presence of which the reaction products are manufactured are primarily water soluble organic solvents and desirably those that are infinitely miscible with water. Dioxan, isopropanol, ethanol and methanol, ethylene glycol-n-butyl ether (= n-butyl glycol), diethylene glycol monobutyl ether, dimethyl formamide, may be cited as examples.

Moreover, it is also possible to carry out the reaction in the presence of water-insoluble solvents, e.g. in hydrocarbons like petrol, benzene, toluene, xylene; halogenated hydrocarbons, e.g. methylene bromide, carbon tetrachloride, ethylene chloride, ethylene bromide, s-tetrachloroethane and especially also trichloroethylene.

The preparations according to the invention contain reaction products that are manufactured using component (2) or they contain the reaction products in admixture with component (2). At least one aminoplast precondensate should be used either as reaction component (2) for the manufacture of the reaction products or as mixture component.

The preparations can contain, for example, the following reaction products or mixtures: reaction products of:

(a), (b), (c), (e), (2),
(a), (b), (c), (d), (2)
(a), (b), (c), (d), (e), (2)
(a), (b), (c), (2)
(a), (b), (c), (e), (f), (2)
(a), (b), (c), (d), (f), (2)
(a), (b), (c), (f), (2), or these reaction products in admixture with component (2), which then does not necessarily have to be used as reaction component.

The solids content in the preparations can be about 40 to 70 percent by weight.

The preparations of the reaction products can be used for various purposes, in particular as dressing agents for leather or as binders and coating agents for textiles, e.g. for nonwovens, textile floor coverings (carpets) and the like. They are normally applied from an aqueous medium which contains the reaction products in emulsified form. To this end, the preparations of the reaction products are mixed with water and optionally with wetting agents and dispersants. The resultant stable, aqueous emulsions can have a pH of about 3 to 8, preferably 4 to 6. The solids content can be about 10 to 40 percent by weight. Examples of suitable wetting agents and dispersants are adducts of an alkyleneoxide, preferably ethylene oxide, and aliphatic or cycloaliphatic amines, alcohols, fatty acids or fatty amides of higher molecular weight which are also optionally esterified at the hydroxy groups with polybasic or organic acids or, if they are nitrogen compounds, can also be quaternized. In addition, these compounds can also be reacted with further compounds in order to obtain e.g. a cross-linking effect.

Besides the emulsified reaction products or mixtures of the reaction products and the aminoplast precondensates, the application liquors can contain still other additives, e.g. acids, salts, or also finishing or improving agents. Phosphoric, sulphuric and hydrochloric acid or also oxalic, formic and acetic acid may be cited as examples of acids.

The amount of reaction product or mixture of reaction product and aminoplast precondensate (exclusive of solvent and water), based on the substrate, is appropriately 1 to 10 g/m² for dressing leather and about 10 to 50, preferably 10 to 30, percent by weight for finishing and bonding nonwovents. The application is effected as a rule at 20°C to 100°C, preferably at room temperature, and by known methods, for example by immersion, spraying, injecting, brushing, padding etc.

The leather to be finished can be of any desired provenance, but preferably so-called grained leather is used, i.e. leather that is dressed on the grain side. The leather finishing can be carried out in two steps by applying the preparations according to the invention e.g. together with a dye or pigment suitable for colouring leather, drying the treated and then applying a colourless preparation that is able to impart e.g. an additional sheen to the coloured layer. The leather finished with these dressing agents has very good general fastness properties, in particular very good fastness to light, wet treatment and dry rubbing; it is also fast to hot pressing and creasing. The handle is also markedly improved. The dressed leather can therefore be termed as "easy-care". In the light of all its fastness properties, it is superior to a leather that is dressed with polyurethanes or polyacrylates. In addition to the described effects, a very good antimicrobial finish is imparted to the leather.

The customary textile fibres as well as also glass fibres are possible for manufacturing the textiles, e.g. nonwovens, that are finished with the preparations according to the invention. Particularly suitable are bonded fabrics made from e.g. cotton, viscose staple fibre or synthetic polyamide, polyester, polyacrylonitrile or polypropylene fibres. Blends of these fibrous materials are also suitable.

The nonwovens finished with the preparations according to the invention have a good strength and at the same time very good handle characteristics. In addition to the described effects, a very good antimicrobial finish is simultaneously imparted to the substrates with the preparations according to the invention. This type of finish is particularly useful if the textile materials mentioned herein are used as floor coverings, e.g. needle felt carpets or mats, for foot grids and surrounds of swimming baths, as wall coverings or as filter materials, e.g. as air filters, since these material are particularly subject to microbial attack, for example by bacteria and fungi.

The microbial effect is against representatives of the Gram-positive and Gram-negative bacteria, for example against Staphylococous aureus, Escherichia coli and Proteus vulgaris or against fungi, for example Trichophyton mentagrophytes.

The textile materials finished with the preparations according to the invention exhibit good fastness to washing, shampooing and dry cleaning. The antimicrobial effect is therefore retained in the same way as the good strength and the good handle characteristics.

The following Examples illustrate the invention, the parts and percentages being by weight.

Manufacturing Examples

Example 1

A mixture of 49 g of an epoxide formed from 2,2-bis(4'-hydroxyphenyl)-propane and epichlorohydrin (0.25 epoxide equivalent), 27 g of stearylamine (0.1 amino group equivalent) and 10 g of ethylene glycol monobutyl ether is stirred for 1 hour at 100°C internal temperature.

Then 49.4 g (0.175 acid equivalent) of a mixture of about 95% dimerized $C_{36}$ acid and about 4% trimerized $C_{54}$ acid (based on linoleic and linolenic acid) and 12.5 g of sebacic acid (0.125 acid equivalent) are added thereto and stirring is continued for a further 3 hours at 100°C internal temperature. Then 11.6 g of epichlorohydrin (0.125 mole) are added and stirring is further continued for 2 hours at 100°C internal temperature.

An 80% solution of 149.5 g of hexamethylolmelamine dibutyl- and tributyl ether in butanol, which has previously been diluted with 60 g of ethylene glycol monobutyl ether, is subsequently added dropwise over 30 minutes and the batch is stirred for 1 hour at 100°C. Dilution with 191.5 g of perchloroethylene yields a 50% clear resin solution. The acid number is 22.

To this resin solution (560 g) are then added 67 g of a 50% aqueous solution of an adduct of hydroabietyl alcohol and 200 moles of ethylene oxide (treated with 1% hexamethylene-1,6-diisocyanate) and 27 g of a 50% aqueous solution of an adduct if hydroabietylamine and 70 moles of ethylene oxide. A finely disperse emulsion is obtained after addition of 746 g of water and using an emulsifier. The resin content is 20% and the pH is 4.3.

Example 2

A mixture of 98 g of an epoxide according to Example 1 (0.5 epoxide equivalent) 54 g of stearylamine (0.2 amino group equivalent) and 20 g of ethylene glycol monobutyl ether is stirred for 1 hour at 100°C internal temperature. Then 113 g (0.4 acid equivalent) of the mixture of the polymerized acids according to Example 1 and 18.25 g of adipic acid are added thereto and stirring is continued for 3 hours at 100°C internal temperature. Subsequently 23.2 g of epichlorohydrin (0.25 mole) are added and stirring is again continued for 2 hours at 100°C internal temperature. Dilution with 286.45 g of perchloroethylene yields a 50% clear resin solution. The acid number is 48.5.

To 120 g of this resin solution are added 50 g of an 80% solution of hexamethylolmelamine dibutyl and tributyl ether in butanol, 24 g of a 50% solution of an adduct of hydroabietyl alcohol and 200 moles of ethylene oxide (cross-linked with 1% hexamethylene-1,6-diisocyanate), and 9.6 g of a 50% solution of an adduct of hydroabietylamine and 70 moles of ethylene oxide. A finely disperse emulsion is obtained upon addition of 296.4 g of water and using an emulsifier. The resin content is 20% and the pH is 4.5.

Example 3

A mixture of 98 g of an epoxide according to Example 1 (0.5 epoxide equivalent), 67.5 g of stearylamine (0.25 amino group equivalent) and 20 g of ethylene glycol monobutyl ether in stirred for 1 hour at 100°C internal temperature. Then 113 g (0.4 acid equivalent) of the mixture of the polymerized acids according to Example 1 are added thereto and stirring is continued for 3 hours at 100°C internal temperature. Subsequently 23.2 g of epichlorohydrin (0.25 mole) are added and stirring is further continued for 1 hour at 100°C internal temperature. Dilution with 281.7 g of perchloroethylene yields a clear 50% resin solution. The acid number is 29.5.

This resin solution (280 g) is then mixed with 75 g of a 80% solution of hexamethylolmelamine dibutyl and tributyl ether in butanol. To this mixture are added 48 g of a 50% aqueous solution of an adduct of hydroabietyl alcohol and 200 moles of ethylene oxide (cross linked with 1% hexamethylene-1,6-diisocyanate), and 19.2 g of a 50% aqueous solution of an adduct of hydroabietylamine and 70 moles of ethylene oxide. A finely disperse emulsion is obtained upon addition of 577.8 g of water and using an emulsifier. The resin content is 20% and the pH is 6.6.

Example 4

A mixture of 98 g of an epoxide according to Example 1 (0.5 epoxide equivalent), 54 g of stearylamine (0.2 amino group equivalent) and 20 g of butyl glycol is stirred for 1 hour at 100°C internal temperature. Then 98.8 g (0.35 acid equivalent) of the acid mixture according to Example 1 and 25 g of sebacic acid (0.25 acid equivalent) are added and stirring is continued for a further 3 hours at 100°C internal temperature. Then 23.2 g of epichlorohydrin (0.25 mole) are added and stirring is continued for 2 hours at 100°C internal temperature. Dilution with 279 g of perchloroethylene yields a 50% clear resin solution. The acid number is 39.8.

To 280 g of this resin solution are added 75 g of an 80% solution of hexamethylolmelamine dibutyl and tributyl ether in butanol, 48 g of a 50% solution of an adduct of hydroabietyl alcohol and 200 moles of ethylene oxide (cross-linked with 1% hexamethylene-1,6-diisocyanate) and 19.2 g of a 50% solution of an adduct of hydroabietylamine and 70 moles of ethylene oxids. A finely disperse emulsion is obtained after addition of 577.8 g of water and using an emulsifier.

The resin content is 20% and the pH is 4.3.

Example 5

A mixture of 98 g of an epoxide according to Example 1 (0.5 epoxide equivalent), 54 g of stearylamine (0.2 amino group equivalent) and 20 g of butyl glycol is stirred for 1 hour at 100°C internal temperature. Then 113 g (0.4 acid equivalent) of the acid mixture according to Example 1 and 18.25 g of adipic acid (0.25 acid equivalent) are added thereto and stirring is continued for 3 hours at 100°C internal temperature). Then 23.2 g of epichlorohydrin (0.25 mole) are added and stirring is continued once more for 2 hours at 100°C internal temperature. Dilution with 286.45 g of perchloroethylene yields a clear 50% resin solution. The acid number is 48.5.

To 280 g of this resin solution are added 75 g of an 80% solution of hexamethylolmelamine dibutyl and tributyl ether in buutanol, 48 g of a 50% solution of an adduct of hydroabietyl alcohol and 200 moles of ethylene oxide (cross-linked with 1% hexamethylene-1,6-diisocyanate) and 19.2 g of a 50% solution of an adduct of hydroabietylamine and 70 moles of ethylene oxide. A finely disperse emulsion is obtained after addition of 577.8 g of water and using an emulsifier. The resin content is 20% and the pH is 4.5.

Example 6

A mixture of 98 g of an epoxide according to Example 1 (0.5 epoxide equivalent), 62 g of a mixture of 1-amino-eicosane and 1-amino-docosane (0.2 amino group equivalent) and 20 g of butyl glycol is stirred for 1 hour at 100°C internal temperature. Then 98.8 of the mixture of polymerized acids according to Example 1 (0.35 acid equivalent) and 14.75 g of succinic acid (0-25 acid equivalent) are added and stirring is continued for 3 hours at 100°C internal temperature. Then 23.2 g of epichlorohydrin (0.25 mole) are added and stirring is continued once more for 2 hours at 100°C internal temperature). Dilution with 276.75 g of perchloroethylene yields a 50% clear resin solution (acid number: 43). To 240 g of this resin solution are added 100 g of an 80% solution in butanol of hexamethylolmelamine dibutyl and tributyl ether (=.80 g of 100% product), 48 g of a 50% aqueous solution of hydroabietyl alcohol and 200 moles of ethylene oxide (cross-linked with 1% hexamethylene-1,6-diisocyante) and 19.2 g of a 50% aqueous solution of an adduct of hydroabietylamine and 70 moles of ethylene oxide.

A finely disperse emulsion is obtained after addition of 592.8 g of water and sing an emulsifier. Resin content: 20%, pH: 5.4.

Example 7

A mixture of 98 g of an epoxide according to Example 1 (0.5 epoxide equivalent), 54 g of stearylamine (0.2 amino group equivalent) and 20 g of butyl glycol is stirred for 1 hour at 100°C internal temperature. Then 150 g of a mixture of about 91% trimerized $C_{54}$ acid and 5% dimerized $C_{36}$ acid, based on linoleic and linolenic acid (0.5 acid equivalent), are added and stirring is continued for 2 hours at 100°C internal temperature. Then 23.2 g of epichlorohydrin (0.25 mole) are added thereto and stirring is continued for 30 minutes at 100°C internal temperature. Dilution with 305.2 g of perchloroethylene yields a 50% clear resin solution. The acid number is 46.3 240 g of this 50% resin solution are mixed with 100 g of an 80% solution in butanol of hexamethylolmelamine dibutyl and tributyl ether (80 g of 100% product, 48 g of a 50% aqueous solution of an adduct of hydroabietyl alcohol and 200 moles of ethylene oxide (cross-linked with 1% hexamthylene-1,6-diisocyanate) and 19.2 g of a 50% aqueous solution of an adduct of hydroabietylamine and 70 moles of ethylene oxide. A finely disperse emulsion is obtained after addition of 592.8 g of water and using an emulsifier. Resin content: 20%, pH: 6.8.

Example 8

120 g of the 50% resin solution according to Example 4 are mixed with 50 g of an 80% solution in butanol of hexamethylolmelamine dibutyl and tributyl ether, 24 g of a 50% aqueous solution of an adduct of hydroabietyl alcohol and 200 moles of ethylene oxide (cross-linked with 1% hexamethylene-1,6-diisocyanate) and 9.6 g of a 50% aqueous solution of an adduct of hydroabietylamine and 70 moles of ethylene oxide. A finely disperse emulsion is obtained after addition of 296.4 g of water and using an emulsifier. Resin content: 20%, pH: 5.3.

Example 9

A mixture of 98 g of an epoxide according to Example 1 (0.5 epoxide equivalent), 54 g of stearylamine (0.2 amino group equivalent) and 20 g of butyl glycol is stirred for 1 hour at 100°C internal temperature. Then 98.8 g of the mixture of polymerized acids according to Example 1 (0.35 acid equivalent) and 13 g of malonic acid (0.25 acid equivalent) are added thereto and stirring is continued for 2 hours at 100°C internal temperature. Then 23.2 g of epichlorohydrin (0.25 mole) are added and stirring is continued once more for 2 hours at 100°C internal temperature. Dilution with 267 g of perchloroethylene yields a 50% clear resin solution. Acid number: 41.5

To 100 g of this resin solution are added 62.5 g of an 80% solution in butanol of hexamethylolmelamine dibutyl and tributyl ether, 24 g of a 50% aqueous solution of an adduct of hydroabietyl alcohol and 200 moles of ethylene oxide (cross-linked with 1% hexamethylene-1,6-diisocyanate) and 10 g of a 50% aqueous solution of an adduct of hydroabietylamine and 70 moles of ethylene oxide. A finely disperse emulsion is obtained after addition of 136.5 g of water and using an emulsifier.

Example 10

A mixture of 98 g of an epoxide according to Example 1 (0.5 epoxide equivalent), 54 g of stearylamine (0.2 amino group equivalent) and 20 g of butyl glycol is stirred for 1 hour at 100°C. Then 98.8 g of the mixture of polymerized acids according to Example 1 (0.35 acid equivalent) and 11.25 g of oxalic acid (anhydrous, 0.25 acid equivalent are added thereto and stirring is continued for 2 hours at 100°C internal temperature. Then 23.2 g of epichlorohydrin (0.25 mole) are added and stirring is continued for 1 hour at 100°C. Dilution with 265.25 g of perchloroethylene yields a clear 50% resin solution. Acid number: 71.2.

To 100 g of this resin solution are added 62.5 g of an 80% solution in butanol of hexamethylolmelamine-dibutyl and tributyl ether, 24 g of a 50% aqueous solution of an adduct of hydroabietyl alcohol and 200 moles of ethylene oxide (cross-linked with 1% hexamethylene-1,6-diisocyanate) and 10 g of a 50% aqueous solution of an adduct of hydroabietylamine and 70 moles of ethylene oxide. A finely disperse emulsion is obtained after addition of 136.5 g of water and using an emulsifier. Resin content: 30%, pH value: 3.7.

Example 11

A mixture of 98 g of an epoxide according to Example 1 (0.5 epoxide equivalent), 54 g of stearylamine (0.2 amino group equivalent) and 20 g of butyl glycol is stirred for 1 hour at 100°C. Then 98.8 g of the mixture of polymerized acids according to Example 1 (0.35 acid equivalent) and 12.25 g of maleic anhydride (0.25 acid equivalent) are added thereto and stirring is continued for 2 hours at 100°C internal temperature. Then 23.2 g of epichlorohydrin (0.25 mole) are added and stirring is continued for 1 hour at 100°C internal temperature. Dilution with 266.25 g of perchloroethylene yields a clear 50% resin solution. Acid number: 45.2.

To 100 g of this resin solution are added 62.5 g of an 80% solution in butanol of hexamethylolmelamine dibutyl and tributyl ether, 24 g of a 50% aqueous solution of an adduct of hydroabietyl alcohol and 200 moles of ethylene oxide (cross-linked with 1% hexamethylene-1,6-diisocyanate) and 10 g of a 50% aqueous solution of an adduct of hydroabiethylamine and 70 moles of ethylene oxide. A finely disperse emulsion is obtained after addition of 136.5 g of water and using an emulsifier.

Example 12

A mixture of 98 g of an epoxide according to Example 1 (0.5 epoxide equivalent), 54 g of stearylamine (0.2 amino group equivalent) and 20 g of butyl glycol is stirred for 1 hour a 100°C internal temperature. Then 98.8 g of the mixture of polymerized acids according to Example 1 (0.35 acid equivalent) and 18.5 g of phthalic anhydride (0.25 acid equivalent) are added thereto and stirring is continued for 2 hours at 100°C internal temperature. Then 23.2 g of epichlorohydrin (0.25 mole) are added and stirring is further continued for 1 hour at 100°C internal temperature. Dilution with 272.5 g of perchloroethylene yields a clear 50% resin solution. Acid number: 41.5.

To 100 g of this resin solution are added 62.5 g of an 80% solution in butanol of hexamethylolmelamine dibutyl and tributyl ether, 24 g of a 50% aqueous solution of an adduct of hydroabietyl alcohol and 200 moles of ethylene oxide (cross-linked with 1% hexamethylene-1,6-diisocyanate) and 10 g of a 50% aqueous solution of an adduct of hydroabietylamine and 70 moles of ethylene oxide. A finely disperse emulsion is obtained after addition of 136.5 g of water and using an emulsifier. Resin content: 30%, pH: 6.2.

Example 13

A mixture of 92.4 g of a epoxide according to Example 1 (0.2 epoxide equivalent), 27 g of stearylamine (0.1 amino group equivalent), 27.8 g of a mixture of about 91% trimerized $C_{54}$ acid and 5% dimerized $C_{36}$ acid (derived from linoleic and linolenic acids) (0.1 acid equivalent) and 50 g of butyl glycol is stirred for 4 hours at an internal temperature of 100°C. Then 5.3 g of acrylonitrile (0.1 mole) are added thereto and stirring is continued for 1 hour at 100°C. Dilution with 102.5 g of perchloroethylene yields a 50% clear resin solution. The acid number is 32. Viscosity: 21 800 cP at 20°C. Then 120 g of this resin solution are mixed with 50 g of a 75% solution in butanol of hexamethylolmelamine dibutyl and tributyl ether and 34g of a 50% aqueous solution of an adduct of hydroabietyl alcohol and 200 moles of ethylene oxide (cross-linked with 1% hexamethylene-1,6-diisocyanate). A finely disperse emulsion is obtained after addition of 122 g of water and using an emulsifier. Resin content: 30%, pH: 6.1.

Example 14

A mixture of 197 g of an epoxide according to Example 1 (0.2 epoxide equivalent), 27 g of stearylamine (0.1 amino group equivalent) and 100 g of butyl glycol is stirred for 1 hour at 100°C internal temperature. Then a solution of 27.8 g of a mixture of about 91% trimerized $C_{54}$ acid and 5% dimerized $C_{36}$ acid (derived from linoleic and linolenic acid; acid equivalent 0.1) and 10 g of butyl glycol is added over the course of 20 minutes. The mixture is then stirred for 2½ hours at 100°C internal temperature. Then 5.3 g of acrylonitrile (0.1 mole) are added and stirring is continued for 1 hour at 100°C internal temperature. Dilution with 147 g of perchloroethylene yields a clear 50% resin solution. The acid number is 24.

120 g of this resin solution are mixed with 50 g of a 75% solution in butanol of hexamethylolmelamine dibutyl and tributyl ether (37.5 g, 100% product), 24 g of a 50% aqueous solution of an adduct of hydroabietyl alcohol and 200 moles of ethylene oxide (cross-linked with 1% hexamethylene-1,6-diisocyanate) and 10 g of a 50% aqueous solution of an adduct of hydroabietylamine and 70 moles of ethylene oxide. A finely disperse emulsion is obtained after addition of 122 g of a water and using an emulsifier. Resin content: 30%, pH: 6.8.

Example 15

A mixture of 92.4 g of an epoxide according to Example 1 (0.2 epoxide equivalent), 18.5 g of dodecylamine (0.1 amino group equivalent). 27.8 g of a mixture of about 91% trimerized $C_{54}$ acid and 5% dimerized $C_{36}$ acid (derived from linoleic acid linolenic acid; 0.1 acid equivalent) and 40 g of butyl glycol is stirred for 4 hours at 100°C internal temperature. Then 5.3 g of acrylonitrile (0.1 mole) are added thereto and the mixture is stirred for 1 hour at 100°C internal temperature. Dilution with 104 g of perchloroethylene yields a 50% clear resin solution. Acid number: 24. Viscosity: 29000 cP at 20°C. 120 g of this resin solution are mixed with 50 g of a 75% solution in butanol of hexamethylolmelamine dibutyl and tributyl ether and 34 g of a 50% aqueous solution of an adduct of hydroabietyl alcohol and 200 moles of ethylene oxide (cross-linked with 1% hexamethylene-1,6-diisocyanate). A finely disperse emulsion is obtained after addition of 122 g of water and using an emulsifier. Resin content: 30%, pH: 6.2.

Example 16

A mixture of 92.4 g of an epoxide according to Example 1 (0.2 epoxide equivalent), 27 g of stearylamine (0.1 amino group equivalent), 22.2 g of a mixture of about 91% trimerized $C_{54}$ acid and 5% dimerized $C_{36}$ acid (derived from linoleic and linolenic acid; 0.08 acid equivalent), 2.3 g of dodecanedicarboxylic acid (0.02 acid equivalent) and 50 g of butyl glycol is stirred for 4 hours at 100°C internal temperature. Then 5.3 g of acrylonitrile (0.1 mole) are added thereto and stirring is continued for 1 hour at 100°C internal temperature. Dilution with 99.2 g of perchloroethylene yields a 50% clear resin solution. Acid number: 23, Viscosity: 15 000 cP at 20°C. 120 g of this resin solution are mixed with 50 g of a 75% solution in butanol of hexamethylolmelamine dibutyl and tributyl ether and 34 g of an aqueous solution of an adduct of hydroabietyl alcohol and 200 moles of ethylene oxide (cross-linked with 1% hexamethylene-1,6-diisocyanate). A finely disperse emulsion is obtained after addition of 122 g of water and using an emulsifier. Resin content: 30%, pH: 6.0.

Example 17

A mixture of 92.4 g of an epoxide according to Example 1 (0.2 epoxide equivalent), 27 g of stearylamine (0,1 amino group equivalent), 13.9 g of a mixture of about 91% trimerized $C_{54}$ acid and 5% dimerized $C_{36}$ acid (derived from linoleic and linolenic acid) 5.05 g of sebacic acid (0.05 acid equivalent) and 50 g of butyl glycol is stirred for 6 hours at 100°C internal temperature. Dilution with 88.35 g of perchloroethylene yields a 50% clear solution. Acid number: 42.

120 g of this resin solution are mixed with 50 g of a 75% solution in butanol of hexamethylolmelamine dibutyl and tributyl ether, 24 g of a 50% aqueous solution of an adduct of hydroabietyl alcohol and 200 moles of ethylene oxide (cross-linked with 1% hexamethylene-1,6-diisocyanate), and 10 g of a 50% aqueous solution of an adduct of hydroabietylamine and 70 moles of ethylene oxide. A finely disperse emulsion is obtained after addition of 122 g of water and using an emulsifier. Resin content: 30%, pH: 5.6.

Example 18

A mixture of 46.2 g of an epoxide according to Example 1 (0.1 epoxide equivalent), 10.8 g of stearylamine (0.04 amino group equivalent), 5.56 g of a mixture of about 91% trimerized $C_{54}$ acid and 5% of dimerized $C_{36}$ acid (derived from linoleic and linolenic acid; 0.02 acid equivalent), 8.08 g of sebacic acid (0.08 acid equivalent) and 20 g of butyl glycol is stirred for 4 hours at 100°C internal temperature. Then 2.8 g of epichlorohydrin (0.03 mole) are added thereto and stirring is continued for 1 hour at 100°C internal temperature. Then 133 g of a 75% solution in butanol of hexamethylamine dibutyl and tributyl ether, which is diluted with 30 g of butyl glycol, are added thereto and stirring is continued for a further 30 minutes at 100°C. Dilution with perchloroethylene yields a 50% clear resin solution. Acid number: 15.

200 g of this resin solution are then mixed with 34 g of a 50% aqueous solution of an adduct of hydroabietyl alcohol and 200 moles of ethylene oxide (cross-linked with 1% hexamethylene-1,6-diisocyanate). A finely disperse emulsion is obtained after dilution with 166 g of water and using an emulsifier. Resin content: 25%, pH: 5.4.

Example 19

A mixture of 46.2 g of an epoxide according to Example 1 (0.1 epoxide equivalent), 13.5 g of stearylamine (0.05 amino group equivalent), 11.12 g of a mixture of about 91% trimerized $C_{54}$ acid and 5% dimerized $C_{36}$ acid (derived from linoleic and linolenic acid; 0.04 acid equivalent), 8.08 g of sebacic acid, and 20 g of butyl glycol is stirred for 4 hours at 100°C internal temperature. Then 2.8 g of epichlorohydrin (0.03 mole) are added thereto and stirring is continued for 1 hour at 100°C. Then 148 g of a 75% solution of hexamethylolmelamine dibutyl and tributyl ether in butanol (diluted with 35 g of butyl glycol) are added over the course of 30 minutes and stirring is continued for a further 30 minutes at 100°C internal temperature. Dilution with 100.7 g of perchloroethylene yields a 50% clear resin solution. acid equivalent: 17. 200 g of this resin solution are then mixed with 34 g of a 50% aqueous solution of an adduct of hydroabietyl alcohol and 200 moles of ethylene oxide (cross-linked with 1% hexamethylene-1,6-diisocyanate). A finely disperse emulsion is obtained after addition of 166 g of water and using an emulsifier; Resin content 25%, pH: 3.5.

Application Examples

Example 20

A polyamide needle felt carpet is impregnated with the following impregnation bath:

750 g of the preparation according to Example 1 (20%)
250 g of water
────────
1000 g Impregnation is effected on a padder adjusted to a roller pressure at which a liquor pick-up of 100% is attained. The speed of the goods is about 2 m/min. Drying takes place over 15 to 20 minutes at 140°C. This needle felt carpet has good resistance to rubbing.

In analogous manner, needle felt carpets of polypropylene are padded with the preparation according to Example 1 at room temperature and subsequently dried for 15 minutes at 120°C.

These finished sample carpets are tested in the agar diffusion test (AATCC test method 90-1970, modified) and in the disinfection test (AATCC test method 100-1970, modified) for their resistance to the following test organisms:

bacteria: Staphylococcus aureus SG 511
Escherichia coli NCTC 8196
Proteus vulgaris NCIB 4175
fungi: Trichophyton mentagrophytes ATCC 9533

1. Agar diffusion test (inhibition test).

Test samples in the form of round discs measuring 2 cm in diameter are punched from the sample carpets. Sterile AATCC bact. Agar BBL (5ml) is then poured into a petri dish. After the agar layer has set, the test samples are laid in the dish with their top sides resting on this agar layer. The 10 ml of the same nutrient medium, which is inoculated with test microorganisms, is poured over the samples.

The inoculation is effected by adjusting overnight cultures of the test microorganisms in Difco brain-heart-infusion broth by dilution with sterile broth in such a way that after addition of the inoculum to the agar, the concentration of the microorganisms is $5·10^5 - 1·10^6$ per ml of agar. The dishes are then incubated for 24 hours at 37° and the inhibition zones are subsequently read off.

A similar procedure is carried out with the test microorganism Trichophyton mentagrophytes ATCC 9533. The deviations from the described procedure are:

The inoculum is prepared by elutriating an at least 7 day old slant agar culture on Mycosel Agar BBL with 10 ml of Mycophil Broth BBL, filtering it through sterile glass wool and adding it to the agar. The microorganism concentration is adjusted to about $5·10^4 - 1·10^6$ spores per ml of agar. The test nutrient medium used in the petri dish for Trichophyton was Mycosel Agar BBL. These dishes are incubated for 7 days at 28°C.

2. Disinfection Test

Test samples in the form of round discs (diameter 2 cm) are punched from the sample carpets under investigation and sterilized with ethylene oxide. The sterilized samples are then inoculated with the test microorganisms using 10 drops of a suspension per sample. The suspension for the inoculum is prepared in the same way as that described for the agar diffusion test and by diluting in such a way that in the end effect the following micrrorganism concentrations are present on the test samples:

bacteria $10^6 - 10^7$ microorganisms per sample and Trichophyton app. $5·10^5$ spores per sample.

The inoculated samples are put into a humid chamber and incubated for 24 hours at 37°C (for Trichophyton at 28°C). Following the incubation in the humid chamber, the samples are extracted in 20 ml of phosphate buffer (pH 7.4) with the addition of 1% TWEEN-80. After the extraction, 1 ml at a time of the solution is mixed with 9 ml of AC-Agar Difco or Mycosel Agar Difco (for Trichophyton) and poured into dishes. For the agar, 1% TWEEN-80 is once again added as blocking agent. These dishes are incubated for 24 hours at 37°C (in the case of Trichophyton for 7 days at 28°C). The germ counts are then taken, comparisons are made with corresponding controls, and any microstatic aftereffects in the dishes (as a consequence of insufficient blocking) are prevented by reinoculation.

The described tests are used to determine whether the test microorganisms are inhibited in their growth (microbiostatic effect) or whether they are destroyed (microbiocidal effect).

The finished felt carpets exhibit good microbial effects:

polyamide felt:
applications of substance: 15, 16, 17 percent by weight
drying temperature: 140°C
result: good action against Trichophyton (fungicidal and fungistatic) and against bacteria (bactericidal and bacteriostatic):
polypropylene felt:
application of substance: 17 percent by weight
drying temperature: 120°C
result: good action against Trichophyton (fungicidal and fungistatic) and against bacteria (bactericidal and bacteriostatic).

Analogous antimicrobial effects are also obtained on the finished fibrous materials with the preparations according to Examples 2 to 19.

Example 21

Binder for nonwovens
a. Viscose staple fibre nonwoven fabric (staple length 70 mm, 3,5 denier) is padded at room temperature with a 10% emulsion according to Example 4 and subsequently dried for 10 minutes at 120°C and 140°C. The application of reaction product, based on the weight of the substrate, is about 11 percent by weight. The bonded nonwoven has a very good handle without any hardening effects. These properties are also retained after washing (15 minutes at 80°C in a 400 ml liquor containing 0.8 g of a commercial detergent) or cleaning (15 minutes in trichloroethylene).

| Mechanical properties: | tear length | (120°C) 0.59 km |
| --- | --- | --- |
| | | (140°C) 0.76 km |
| | elongation | (120°C) 30% |
| | | (140°C) 23% | b. Viscose staple fibre nonwoven fabric according to a) is padded at room temperature with aqueous emulsions according to Examples 15, 16, 18 and 19 and subsequently dried for 5 minutes at 140°C. The properties of the viscose staple fibre nonwovens finished in this manner are given hereinbelow:

| | | application | tear length | elongation | resistance to water* | resistance to cleaning* |
| --- | --- | --- | --- | --- | --- | --- |
| Example | 15 | 21 % | 0,9 km | 14 % | good | good |
| | 16 | 17 % | 0,8 km | 15 % | good | good |
| | 18 | 17 % | 0,9 km | 13 % | good | good |
| | 19 | 17 % | 0,8 km | 15 % | good | good |

*washing and cleaning as indicated under a).

c. Polyester onwoven fabric (staple length 65 mm, 4.0 denier) is padded at room temperature with a 10% emulsion according to Example 5 and subsequently dried for 10 minutes at 120°C and 140°C. The application of reaction product, based on the weight of the substrate, is about 15% by weight. The bonded nonwoven has a very good handle without signs of hardening. These properties are also retained after washing or cleaning.

| Mechanical properties: | tear length | (120°C) 0.41 km |
| --- | --- | --- |
| | | (140°C) 0.45 km |
| | elongation | (120°C) 41% |
| | | (140°C) 45% |

The nonwovens and carpets finished according to a) exhibit good antimicrobial properties (tests as described in Example 20).

d. Polyester nonwoven fabric according to c) is padded at room temperature with aqueous emulsions according to Examples 15, 16, 18 and 19 and subsequently dried for 5 minutes at 140°C. The properties of the finished nonwovens are indicated hereinbelow:

e. Binder for needle felt carpets

Needle felt carpets of polyamide fibrous material (polyhexamethylene adipic amide) are padded at room temperature with 15% aqueous emulsions according to Examples 15, 16 and 18 and subsequently dried for 15 minutes at 140°C. The application of reaction product, based on the weight of the substrate, is 13.8, 13.5 and 14.1%.

The finished carpeting is tested in the following manner for its resistance to rubbing:
 a. after the finishing
 b. after 5 shampoos (aqueous detergent foam, liquor ratio: 1:10)
 c. after solvent treatment (10 minutes in trichloroethylene).

The samples are rubbed with a polyurethane stopper (diameter 15 mm at a stress of 400 g) 400 times in two directions. All samples are resistant to rubbing.

Example 22 a. Opaque dressing on box calf leather 200 parts of an iron oxide dispersion (40% pigment content) are mixed with 450 parts of the emulsion according to Example 1 and subsequently diluted with water to 1000 parts. The pigmented finishing solution is sprayed 4 times crosswise on box calf leather. The leather is then dried and subsequently sprayed twice cross-wise with a colourless finishing solution of
 450 parts of the emulsion according to Example 1
 10 parts of phosphoric acid and
 490 parts of water
at 25°C to 30°C. The leather is then dried for 2 hours at 60°C and ironed at 80°C/100 bar.

b. Box calf leather is sprayed on both sides with the colourless finishing solution according to (a) and then dried.

The finished leather has a good antimicrobial action both on its top side (finish a) and on both sides (finish b) in the tests as described in Example 20. Moreover, the leather is provided with a finish which is fast to light and rubbing. It has good crease resistance and the edges can be not pressed up to 250°C.

Analogous results are obtained with the emulsions according to Examples 6 to 13.

Example 23

Aniline finish on vachette leather
10 parts of the dye of the formula

| | | application | tear length | elongation | resistance to water* | resistance to cleaning* |
| --- | --- | --- | --- | --- | --- | --- |
| Example | 15 | 24 % | 2,2 km | 58 % | good | good |
| | 16 | 18 % | 1,5 km | 57 % | good | good |
| | 18 | 24 % | 1,9 km | 55 % | good | good |
| | 19 | 18 % | 1,5 km | 59 % | good | good |

*washing and cleaning as described under a).

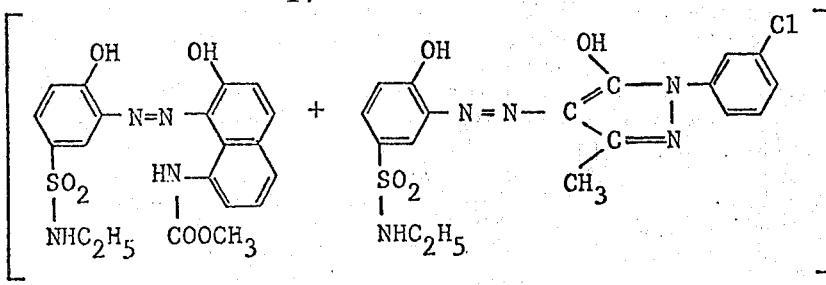

are dissolved in 300 parts of water. To this solution are added 400 parts of the emulsion according to Example 1 and 5 parts of phosphoric acid. After it has been diluted with water to 1000 parts, this coloured finishing solution is sprayed 3 times cross-wise on vachette leather. The treated leather is then dried at room temperature or at 40°C and subsequently sprayed once or twice cross-wise with a colourless finishing solution of 400 parts of the emulsion according to Example 1
10 parts of phosphoric acid and
590 parts of water.

The leather is then dried for 1 to 2 hours at 60°C and pressed at 80°C/bar.

The treated leather is fast to light and rubbing. It has good crease resistance and is fast to hot pressing up to 200°C. It has an antomicrobial finish (tests as described in Example 20).

Example 24

Aniline dressing on nappa
30 parts of a dispersed pigment of the formula

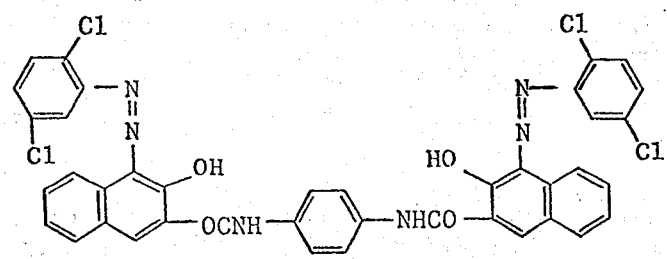

are mixed with 400 parts of the emulsion according to Example 1 and 10 parts of phosphoric acid and the mixture is diluted with water to 1000 parts.

The dyed nappa is sprayed twice cross-wise with this solution, dried and then sprayed with a colourless gloss solution of 400 parts of the emulsion according to Example 1
10 parts of phosphoric acid and
590 parts of water.

The leather is subsequently dried, stored for 1 hour at 60°C and then pressed at 80°C. The treated leather has good general fastness properties, an excellent handle and has an antimicrobial finish (tests as described in Example 20).

The emulsions according to Example 13 to 19 can also be used to equally good effect.

We claim:

1. A preparation of reaction products of epoxides, fatty amines and fatty acids which contains
   1. reaction products of
      a. 1 epoxide equivalent of an epoxide that contains at least two epoxide groups per molecule,
      b. a 0.1 to 0.7 amino group equivalents of a fatty amine with 12 to 24 carbon atoms,
      c. a 0.2 to 1.5 acid equivalents of a dimerized and-/or trimerized fatty acid that is derived from monomeric unsaturated fatty acids with 16 to 22 carbon atoms, and
   2. an aminoplast precondensate that contains alkyl ether groups and is used in admixture with (1) or as reaction component for the manufacture of (1) or is used as mixture and reaction component and which is 10 to 80% by weight based on the total weight of components (a) to (c) and (2).

2. A preparation according to claim 1, which is a solution in organic solvents, emulsion or dispersion.

3. A solution of reaction products of epoxides, fatty amines and fatty acids in organic solvents according to claim 2, which contains
   1. reaction products of
      a. 1 epoxide equivalent of an epoxide that contains at least two epoxide groups per molecule,
      b. a 0.1 to 0.7 amino group equivalents of a fatty amine with 12 to 24 carbon atoms,
      c. a 0.2 to 1.5 acid equivalents of a dimerized and-/or trimerized fatty acid that is derived from monomeric unsaturated fatty acids with 16 to 22 carbon atoms, and
   2. an aminoplast precondensate that contains alkyl ether groups and is used in admixture with (1) or as reaction component for the manufacture of (1) or is used as mixture and reaction component and which is 10 to 80% by weight based on the total weight of components (a) to (c) and (2).

4. The preparation according to claim 1 which contains reaction products of components (a), (b), (c) and (2).

5. The preparation according to claim 1, wherein component (a) is an epoxide derived from a bisphenol.

6. The preparation according to claim 5, wherein component (a) is a polyglycidyl ether of 2,2-bis-(4'-hydroxyphenyl)-propane.

7. The preparation according to claim 1, wherein the component (a) has an epoxide content of 1 to 6 epoxide group equivalents per kg.

8. The preparation according to claim 5, wherein component (a) is a reaction product of epichlorohydrin with 2,2-bis-(4'-hydroxyphenyl)-propane.

9. The preparation according to claim 1, wherein component (b) is a mono-fatty amine with 16 to 22 carbon atoms.

10. The preparation according to claim 1, wherein component (c) is derived from unsaturated fatty acids with 1 to 5 ethylenically unsaturated bonds.

11. The preparation according to claim 1, wherein component (2) is an alkyl ether of a methylolaminotriazine.

12. The preparation according to claim 11, wherein component (2) is an alkyl ether of a highly methylolated melamine the alkyl radicals of which contain from 1 to 6 carbon atoms.

13. The preparation according to claim 12, wherein component (2) is an n-butyl ether of a highly methylolated melamine which contains 2 to 3 n-butyl radicals in the molecule.

14. The preparation according to claim 1, wherein 0.4 to 1.5 acid equivalents of component (c) are used.

15. The preparation according to claim 1 which contains mixtures of (1) and (2) in the weight ratio of (70 to 40): (30 to 60).

16. The product mixture of claim 1 of reaction products (1) of components (a), (b), (c), and component (2).

17. The preparation according to claim 1, wherein component (2) is an alkyl ether of a highly methylolated melamine, the alkyl radicals of which contain from 3 to 6 carbon atoms.

18. Stable aqueous emulsions of preparations of the reaction products or mixtures according to claim 1.

19. A reaction product of epoxides, fatty amines and fatty acids according to claim 1 which is obtained by reaction of
1. reaction products of
   a. 1 epoxide equivalent of an epoxide that contains at least two epoxide groups per molecule,
   b. a 0.1 to 0.7 amino group equivalent of a fatty amine with 12 to 24 carbon atoms,
   c. a 0.2 to 1.5 acid equivalent of a dimerized and/or trimerized fatty acid that is derived from monomeric unsaturated fatty acids with 16 to 22 carbon atoms, and
2. an aminoplast precondensate that contains alkyl ether groups.

20. The reaction product which is obtained by further reaction of the product of claim 19, with at least one of
   d. an anhydride of an aromatic dicarboxylic acid with at least 8 carbon atoms or an aliphatic monocarboxylic acid with at least 2 carbon atoms or of an aliphatic dicarboxylic acid with at least 4 carbon atoms,
   e. an aliphatic saturated dicarboxylic acid with 2 to 14 carbon atoms and
   f. A difunctional compound selected from the group consisting of epichlorohydrin, epibromohydrin, glycerol dichlorohydrin, acrylic acid, acrylonitrile and methylolacrylamide, and
2. an aminoplast precondensate that contains alkyl ether groups.

21. The product mixture of reaction products of claim 20, of components (a), (b), (c), at least one of (d), (e) and (f) and component (2).

22. The reaction product which is obtained by further reaction of the product of claim 19, with
   e. an aliphatic saturated dicarboxylic acid with 2 to 14 carbon atoms and/or
   f. a difunctional compound selected from the group consisting of epichlorohydrin, epibromohydrin, glycerol dichlorohydrin, acrylic acid, acrylonitrile and methylolacrylamide, and
2. an aminoplast precondensate that conatins alkyl ether groups.

23. The product mixture of reaction products of claim 22, of components (a), (b), (c), (2), (e) and (f) and component (2).

24. A process for the manufacture of preparations according to claim 1, which comprises reacting
1. reaction products of
   a. 1 epoxide equivalent of an epoxide that contains at least two epoxide groups per molecule,
   b. a 0.1 to 0.7 amino group equivalent of a fatty amine with 12 to 24 carbon atoms,
   c. a 0.2 to 1.5 acid equivalent of a dimerized and/or trimerized fatty acid that is derived from monomeric unsaturated fatty acids with 16 to 22 carbon atoms, and
2. an aminoplast precondensate that contains alkyl ether groups in an organic solvent at temperatures of 80°C to 120°C, or mixing the reaction product (1) or the reaction product of (1) and (2) with component (2).

25. A process according to claim 24, which comprises manufacturing preparations of reaction products of the components (a), (b), (c), and (2) and mixing them with component (2).

26. A process according to claim 24, which comprises manufacturing preparations of reaction products of components (a), (b), and (c), and mixing them with component (2).

27. A process for the manufacture of preparations which comprises reacting preparations of claim 24, with at least one of
   d. an anhydride of an aromatic dicarboxylic acid with at least 8 carbon atoms or of an aliphatic monocarboxylic acid with at least 2 carbon atoms, or of an aliphatic dicarboxylic acid with at least 4 carbon atoms,
   e. an aliphatic saturated dicarboxylic acid with 2 to 14 carbon atoms and
   f. a difunctional compound selected from the group consisting of epichlorohydrin, epibromohydrin, glycerol dichlorohydrin, acrylic acid, acrylonitrile and methylolacrylamide, and
2. an aminoplast precondensate that contains alkyl ether groups in an organic solvent at temperatures of 80°C to 120°C, or mixing the reaction product (1 ) or the reaction product of (1) and (2) with component (2).

28. A process according to claim 27, which comprises manufacturing preparations of reaction products of the components (a), (b), (c), (2), at least one of (d), (e) and (f) and mixing them with component (2).

29. A process according to claim 27, which comprises manufacturing preparations of reaction products of components (a), (b), (c), and (d), (e) and (f) and at least one of them with component (2).

30. A process for the manufacture of preparations which comprises reacting preparations of claim 24, with
   e. an aliphatic saturated dicarboxylic acid with 2 to 14 carbon atoms and/or
   f. a difunctional compound selected from the group consisting of epichlorohydrin, epibromohydrin, glycerol dichlorohydrin, acrylic acid, acrylonitrile and methylolacrylamide, and
2. an aminoplast precondensate that contains alkyl ether groups in an organic solvent at temperatures of 80°C to 120°C, or mixing the reaction product (1) or the reaction product of (1 ) and (2) with component (2).

31. A process according to claim 30, which comprises manufacturing preparations of reaction products of components (a), (b), (c), (e) and (f) and mixing them with component (2).

32. A preparation containing the reaction products of claim 1, further reacted with
   e. an aliphatic saturated dicarboxylic acid with 2 to 14 carbon atoms and/or
   f. a difunctional compound selected from the group consisting of epichlorohydrin, epibromohydrin, glycerol dichlorohydrin, acrylic acid, acrylonitrile and methylolacrylamide, and
2. an aminoplast precondensate that contains alkyl ether groups and is used in admixture with (1) or as reaction component for the manufacture of (1) or is used as mixture and reaction component.

33. The product mixture of claim 1 of reaction products (1) of components (a), (b), (c), and (2), and component (2).

34. A preparation containing the reaction products of claim 1, further reacted with at least one of
   d. an anhydride of an aromatic mono- or bicyclic dicarboxylic acid with 8 to 12 carbon atoms, of of an aliphatic monocarboxylic acid with 2 to 10 carbon atoms or of an aliphatic dicarboxylic acid with 4 to 10 carbon atoms,
   e. an aliphatic saturated dicarboxylic acid with 2 to 14 carbon atoms, wherein the amount of acid equivalents of components (d) and (e) being 0.1 to 0.8 and
   f. 0.1 to 0.7 mol of a difunctional compound selected from the group consisting of epichlorohydrin, epibromohydrin, glycerol dichlorohydrin, acrylic acid, acrylonitrile and methylolacrylamide, and
2. an aminoplast precondensate that contains alkyl ether groups and is used in admixture with (1) or as reaction component for the manufacture of (1) or is used as mixture and reaction component and which is 10 to 80% by weight, based on the total weight of components (a) to (f) and (2).

35. The preparation according to claim 34 which contains reaction products of component (a), (b), (c), (d), (f) and (2).

36. The preparation according to claim 34 which contains mixtures of reaction products of components (a), (b), (c), (e) and (f) and of component (2).

37. The preparation according to claim 34, wherein component (d) is an anhydride of a monocyclic aromatic dicarboxylic acid with 8 to 10 carbon atoms.

38. The preparation according to claim 37, wherein component (d) is phthalic anhydride.

39. The preparation according to claim 34, wherein component (e) is an alkylenedicarboxylic acid with 2 to 14 carbon atoms.

40. The preparation according to claim 34, wherein component (e) is a dicarboxylic acid of the formula

in which $y$ is an integer from 1 to 13.

41. The preparation according to claim 40, wherein component (e) is a dicarboxylic acid of the formula

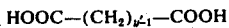

in which $y'$ is an integer from 3 to 13.

42. The preparation according to claim 41, wherein in the formula of the component (e) $y'$ is an integer from 5 to 9.

43. The preparation according to claim 34, wherein component (f) is an epihalohydrin.

44. Stable aqueous emulsions of preparations of the reaction products or mixtures according to claim 34.

45. The preparation according to claim 34, wherein component (d) is phthalic anhydride substituted by methyl.

46. The preparation according to claim 34, wherein 0.1 to 0.6 acid equivalents of components (d) are used.

* * * * *

UNITED STATES PATENT AND TRADEMARK OFFICE
CERTIFICATE OF CORRECTION

PATENT NO. : 3,951,891
DATED : April 20, 1976
INVENTOR(S) : ROSEMARIE TÖPFL ET AL It is certified that error appears in the above-identified patent and that said Letters Patent are hereby corrected as shown below:

Column 19, claim 22, line 67, delete "conatins" and substitute --- contains ---.

Column 21, claim 34, line 24, delete "of" and substitute --- or ---.

Column 20, claim 29, line 53, delete after (c), "and" and substitute --- at least one of ---; lines 53 and 54, delete "at least one of" and substitute --- mixing ---.

Signed and Sealed this

Seventh Day of September 1976

[SEAL]

Attest:

RUTH C. MASON
*Attesting Officer*

C. MARSHALL DANN
*Commissioner of Patents and Trademarks*